United States Patent
Hsu et al.

(10) Patent No.: US 8,687,355 B2
(45) Date of Patent: Apr. 1, 2014

(54) SLIDE AND ROTATION MODULE FOR EXECUTABLE MULTIPLE OPERATION MODE ELECTRONIC DEVICE

(75) Inventors: An Szu Hsu, New Taipei (TW); Chien Cheng Mai, New Taipei (TW); Way Han Dai, New Taipei (TW); Hsiu Fan Ho, New Taipei (TW)

(73) Assignee: First Dome Corporation, New Taipei (TW)

( * ) Notice: Subject to any disclaimer, the term of this patent is extended or adjusted under 35 U.S.C. 154(b) by 197 days.

(21) Appl. No.: 13/422,019

(22) Filed: Mar. 16, 2012

(65) Prior Publication Data
US 2013/0241383 A1    Sep. 19, 2013

(51) Int. Cl.
*G06F 1/16* (2006.01)

(52) U.S. Cl.
USPC ................ 361/679.27; 345/473; 248/285.1; 280/278

(58) Field of Classification Search
USPC ......... 345/168, 163, 207, 419, 420, 156, 165, 345/473, 325; 361/679.32, 679.55, 679.42, 361/679.58, 679.4, 679.46, 679.02, 679.08, 361/679.47, 679.49, 679.33, 679.41, 361/679.48, 679.09, 679.07, 679.31; 248/462, 642, 550, 296.1, 299.1, 248/285.1, 460, 309.1, 244, 298.1; 280/276, 93.514, 124.117, 16, 81.6, 280/278; 180/6.24, 6.38, 400; 16/79, 362
See application file for complete search history.

(56) References Cited

U.S. PATENT DOCUMENTS

| | | | | |
|---|---|---|---|---|
| 5,404,271 | A * | 4/1995 | Satou et al. | ............... 361/679.32 |
| 6,489,949 | B1 * | 12/2002 | Yin | ............................... 345/168 |
| 2003/0021622 | A1 * | 1/2003 | Linyear et al. | ................ 400/718 |

* cited by examiner

*Primary Examiner* — Hung Duong
(74) *Attorney, Agent, or Firm* — Rosenberg, Klein & Lee

(57) ABSTRACT

The present invention discloses a slide and rotation module for an executable multiple operation mode electronic device, providing a structure with inclination-adjustable, movable, rotational and bidirectional folding functions. The slide and rotation module includes a steering arm and a slide seat disposed between the first machine body and the second machine body. The steering arm includes a first end pivoted to a first machine body and a second end pivoted to a second machine body, in which the second end of the steering arm is rotated and translated within a limiting part in response to a motion of the first machine body.

16 Claims, 9 Drawing Sheets

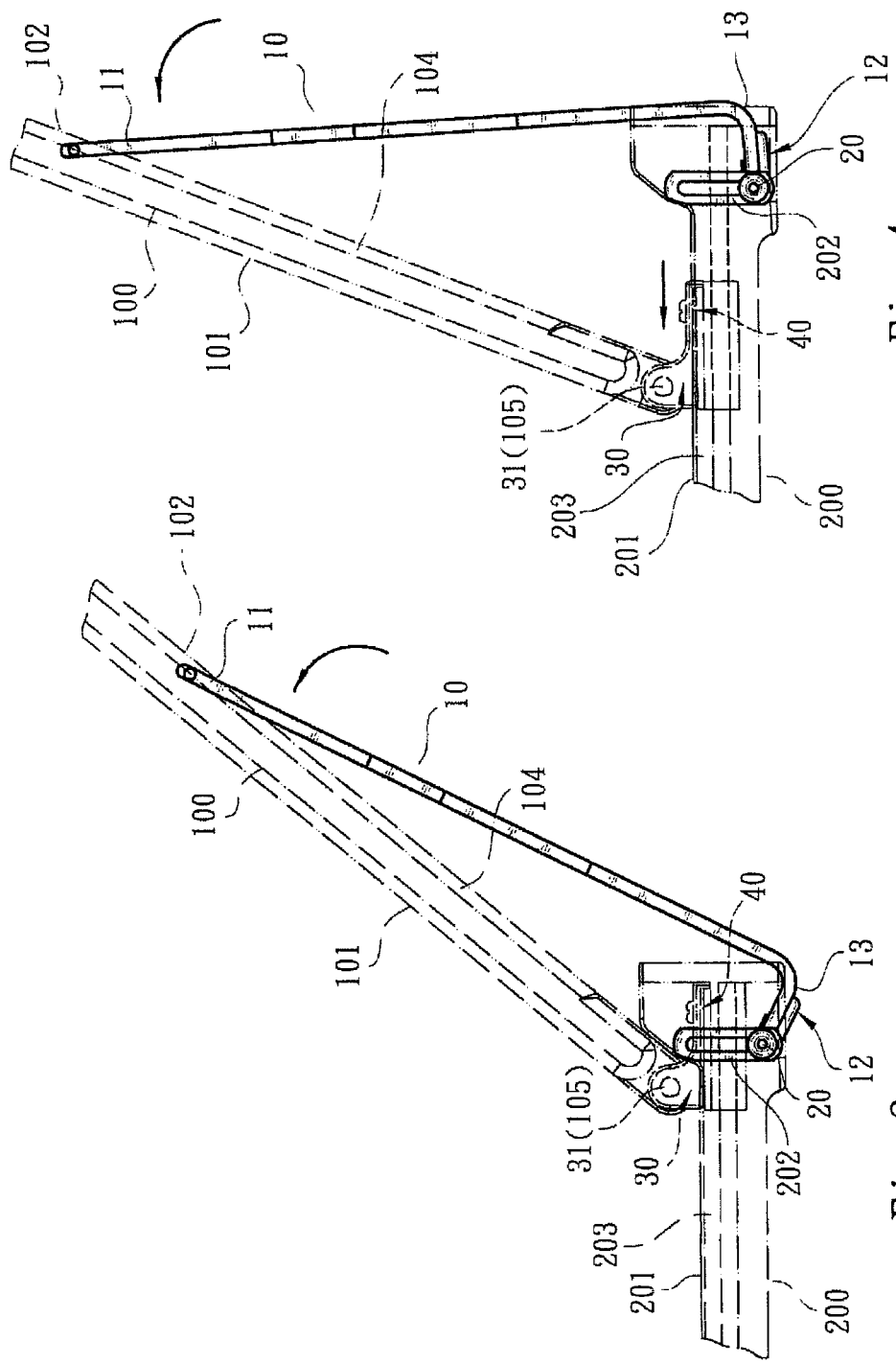

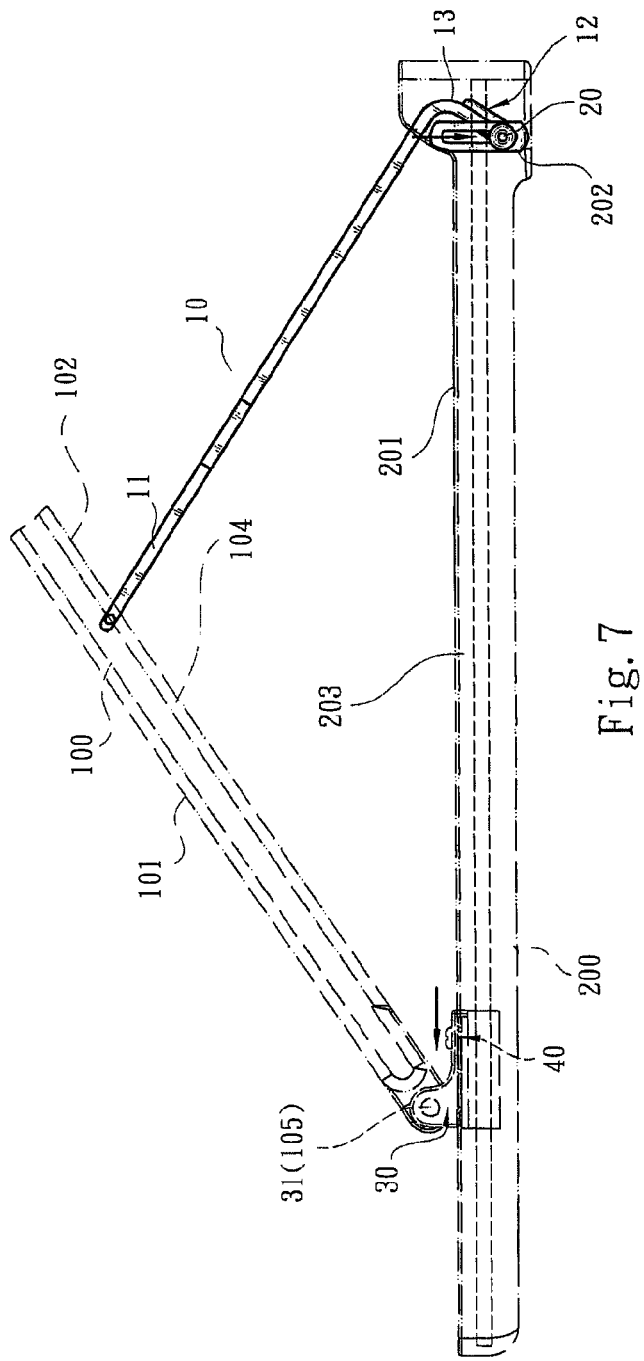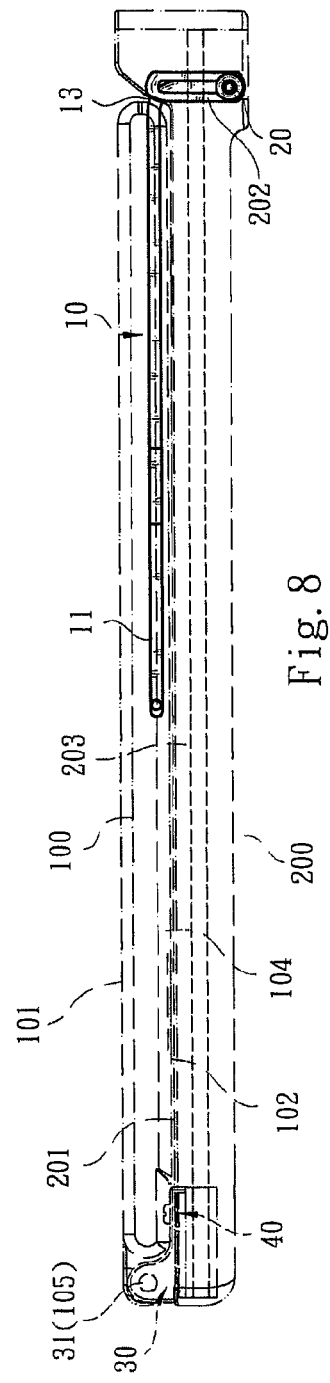

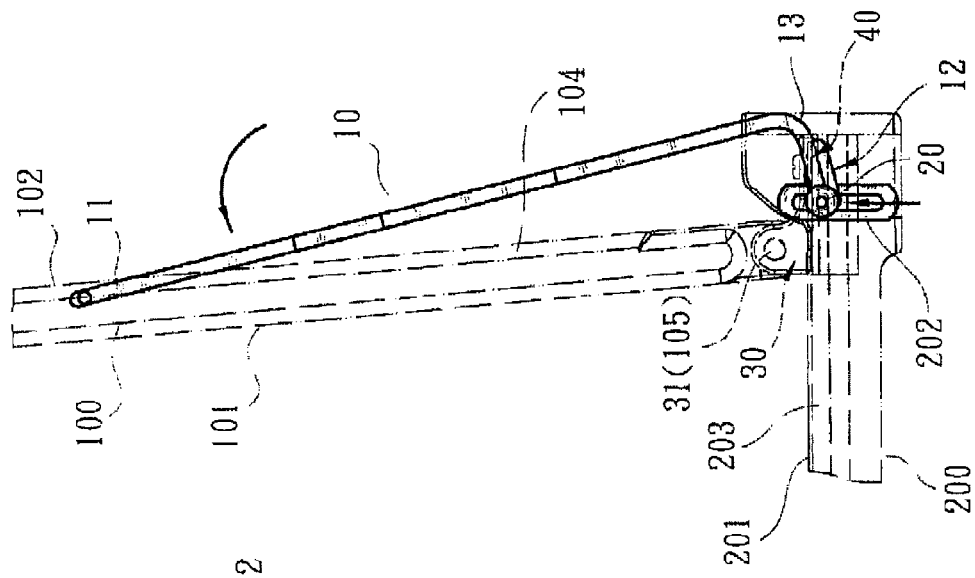
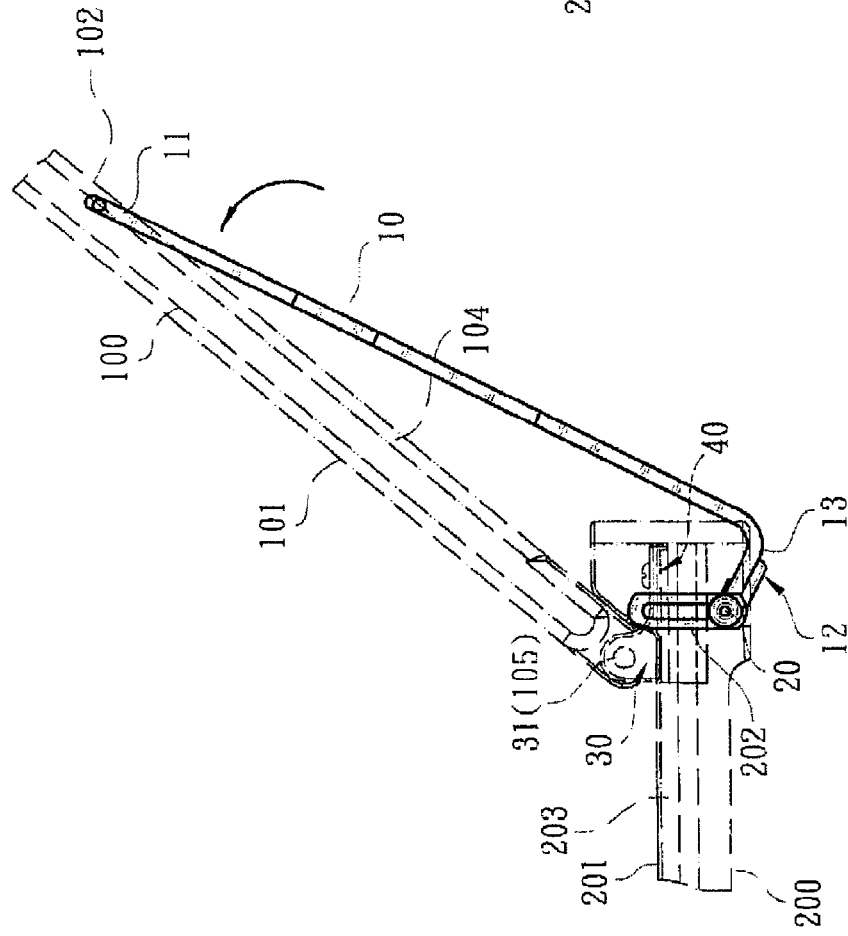
Fig. 10
Fig. 11

SLIDE AND ROTATION MODULE FOR EXECUTABLE MULTIPLE OPERATION MODE ELECTRONIC DEVICE

BACKGROUND OF THE INVENTION

1. Field of the Invention

The present invention relates to a slide and rotation module for an executable multiple operation mode electronic device, in particular relates to a slide and rotation module assembled with a (movable) machine body, capable of providing the machine body with multiple operation modes of inclination-adjustable, movable, rotational and bidirectional folding in operation and fitting processes.

2. Description of the Related Art

Conventionally, electronic devices such as mobile phones, portable computers, personal digital assistants (PDAs), digital cameras and e-books, etc., are generally provided with a slide cover system which is capable of being reciprocally moved or rotated by an external force, thereby moving a slide cover of the electronic device to perform an opening and closing processes. Typical cases such as 'Slide cover component and slide-cover type electronic device' of Taiwan Patent Application No. 99213473 and 'Sliding module and portable electronic device using the same' of Taiwan Patent Application No. 96111996 are disclosed with the relevant skills.

In conventional skills, techniques such as a structure capable of adjusting inclined angle of a monitor system had been disclosed. For example, 'Portable electronic device having inclination adjustable machine body and device seat thereof' of Taiwan Patent No. 95127242 is a typical applicable case. In '242 case, with a support mechanism included with a hinge device to be disposed between a monitor and a host machine body, the monitor can be freely rotated. Therefore, with the functions provided by the support mechanism in accordance to different operation environments or usage requirements, the monitor supported by the support mechanism can be arranged at different inclined angles or kept flat on the host machine body for a user operation. That is to say, '242 case can provide two monitor operation modes, including a supporting operation mode and a flat-placed or lying operation mode.

One topic related to operations, motions and structural designs of the above-described cases is that no protection measure is provided for the monitor system. In another word, a monitor front side of the monitor system is outwardly exposed when the monitor system is in an out-of-service state, so that possible damages to the monitor system are relatively increased. Moreover, to respond accordingly to the tendency of the current monitor system gradually developed from a display monitor to a touch-controlled monitor, it is especially demanded that the monitor system in the out-of-service state shall be carefully guarded by an ideal protection measure.

Another topic related to operations, motions and structural designs of the above-described cases is that a turn-over motion of the monitor is difficult to control due to the monitor is simply pivoted by a support mechanism. One reason is that the turn-over motion of the monitor becomes more difficult if a rotary shaft assembled to the support mechanism has a large torque setting value, i.e., the user must apply a large force to rotate and turn over the monitor. On the other hand, if the rotary shaft assembled to the support mechanism has a small torque setting value, the positioning effect and reliability of the monitor are relatively lessened, and therefore accidental damages to the monitor are occurred.

Another topic related to operations and usages of the above-described cases is that, when the monitor supported by the support mechanism is arranged at an inclined angle for the user to perform touch-controlled functions, the above-described unreliable positioning of the monitor is easily occurred, thus to increase the operation difficulty to the monitor. Accordingly, it reflects to conventional arts that, if designing a monitor system having excellent operating and positioning functions simultaneously, the structural assembly and fitting is definitely complicated, and the relatively increased costs of manufacturing and processing operations are not our expectations.

Representatively speaking, the disclosures of the above-mentioned reference data reveal the conditions of usage and structural design of the monitor/slide cover systems, slide module or the components connected therewith. If the structures and above-described applications of the monitor system and the components connected therewith can be properly redesigned and reconsidered, the use pattern and the range of application of the monitor system can be advancedly altered and increased, thus to be distinguished from conventional products and methods. According to this measure, the damaged conditions of the monitor system in conventional structures can be improved, the monitor system can have increased operation modes and stability in the aspect of operation and motion, and the production and assembly costs for the monitor system can be reduced. However, the above-described topics do not physically taught or implied in the cited reference data.

BRIEF SUMMARY OF THE INVENTION

In view of this, the purpose of the present invention is to provide a slide and rotation module for an executable multiple operation mode electronic device. The slide and rotation module includes a steering arm and a slide seat disposed between the first machine body and the second machine body. The steering arm includes a first end pivoted to a first machine body and a second end pivoted to a second machine body, in which the second end of the steering arm is rotated and translated within a limiting part in response to a motion of the first machine body. The present invention provides a structure with movable, rotational, bidirectional folding and inclination-adjustable functions, thereby changing view angle of the first machine body.

According to the slide and rotation module for the executable multiple operation mode electronic device of the present invention, the slide seat is movably disposed on a rail of the second machine body. The slide seat includes a pivoting part pivoted to the first machine body. Therefore, with the arrangement of the slide seat, the first machine body is allowed to rotate by taking the pivoting part of the slide seat as a fulcrum, or the first machine body is allowed to cover on the second machine body so as not to outwardly expose the monitor front side thereof, thereby assuring a guaranteed protection measure to the monitor front side of the first machine body. With the arrangement of the slide seat cooperated with the steering arm, the first machine body is allowed to freely slide on the second machine body, thereby forming a similar slide cover system functionally.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 3 is a plan schematic view of FIG. 2, illustrating a correlated position condition in which a slide seat is located at an initial point and a first machine body is supported by a steering arm;

FIG. 4 is a schematic view of an embodiment of the present invention in a operation state, illustrating a movement condition of a steering arm and a slide seat by arrows;

FIG. 7 is a schematic view of an embodiment of the present invention in yet another operation state, illustrating a movement condition of a first machine body, a steering arm and a slide seat;

FIG. 8 is a schematic view of a first machine body kept flat on a second machine body of an embodiment of the present invention, illustrating a condition of a steering arm received in a recessed compartment of the first machine body;

FIG. 10 is a plan schematic view of FIG. 2, illustrating a correlated position condition in which a slide seat is located at an initial point and a first machine body is supported by a steering arm;

FIG. 11 is a schematic view of an embodiment of the present invention in an operation state, illustrating a movement condition in which a first machine body is rotated to cover a second machine body and a second end of a steering arm is located within a limiting part;

DETAILED DESCRIPTION OF THE INVENTION

Figure 1:
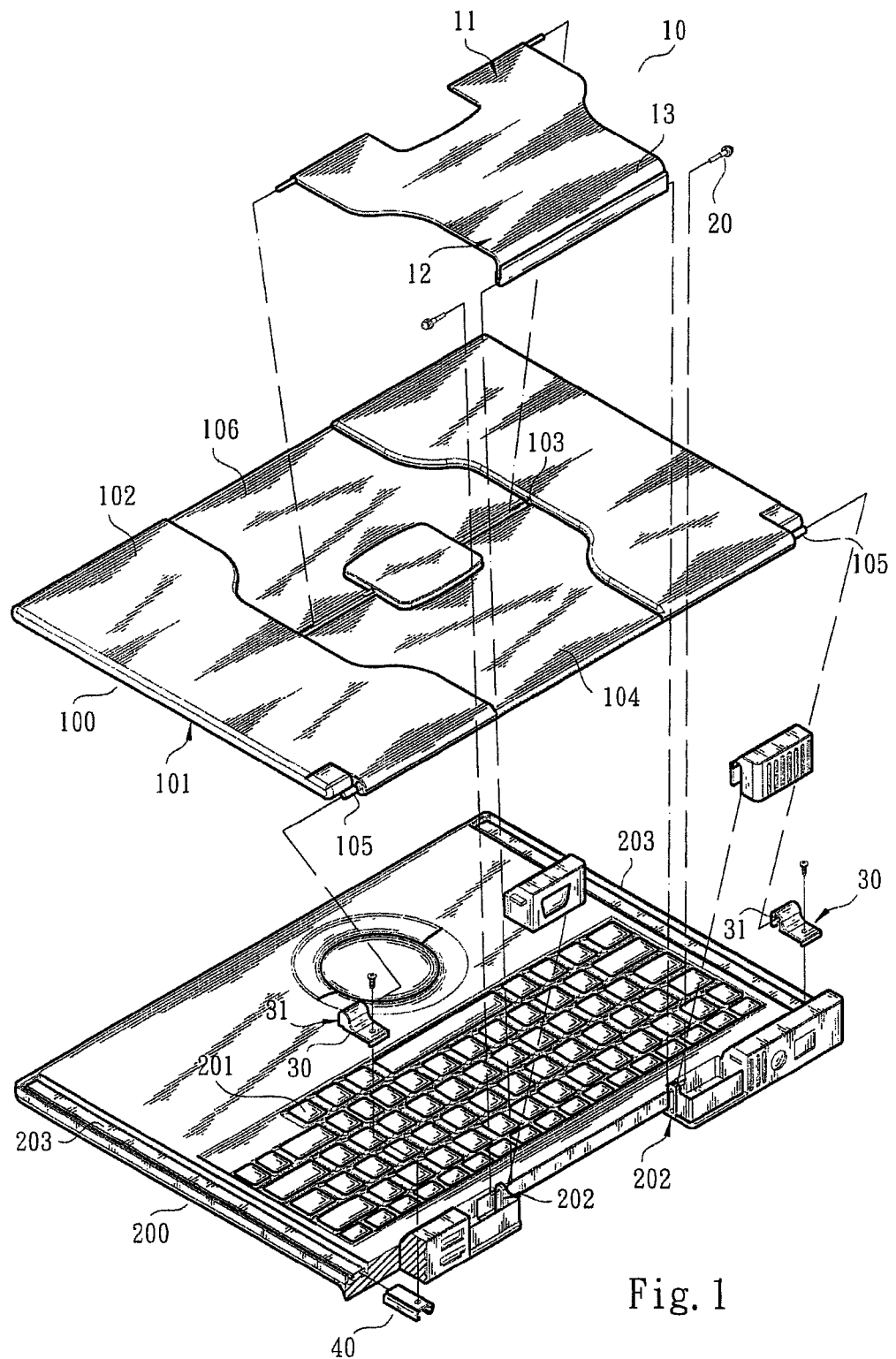
FIG. 1 is an exploded schematic view of a structure of the present invention.
Figure 2:
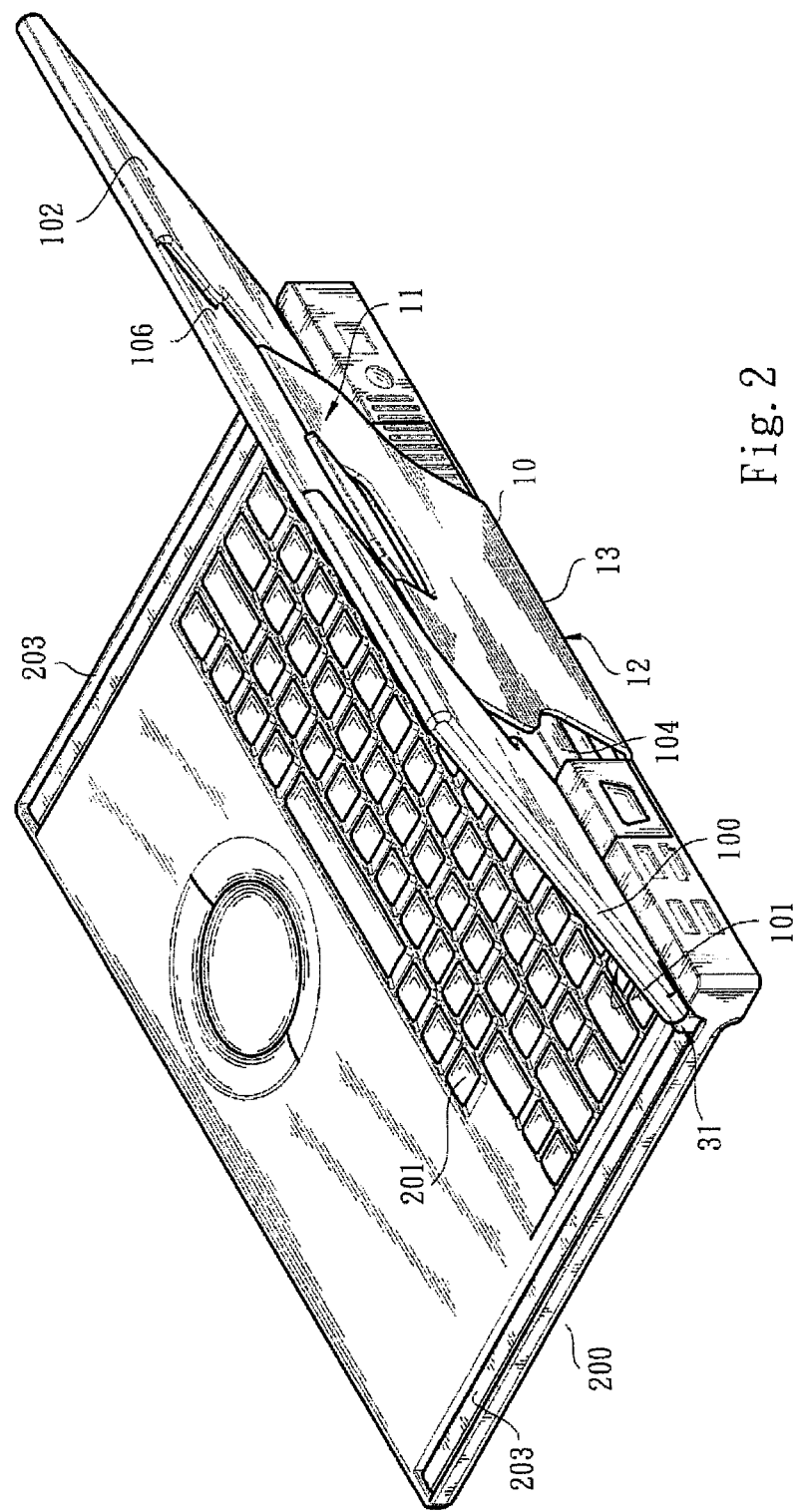
FIG. 2 is an assembled schematic view of a structure of the present invention, illustrating a first machine body arranged at an inclined angle for a user operation.

Referring to FIGS. 1 and 2, a slide and rotation module for an executable multiple operation mode electronic device of the present invention comprises a steering arm generally denoted by reference numeral 10. The steering arm 10 is selected from a plate type with a geometry profile includes a first end 11 pivoted to a first machine body 100 and a second end 12 pivoted to a second machine body 200. In an adopted embodiment, the first machine body 100 is selected from a monitor system defined with a monitor front side 101 and a monitor back side 102, and the second machine body 200 is selected from an electronic host machine or a fixed machine body having an operating region 201.

In FIG. 1, the monitor back side 102 of the first machine body 100 formed with two recessed compartments 104 and 106 is illustrated, in which each of the recessed compartments 104 and 106 has a profile and a shape equal to that of the steering arm 10, so that the steering arm 10 can be received in the recessed compartment 104 or 106. In FIG. 1, the monitor back side 102 of the first machine body 100 disposed with a shaft engaging part 103 is illustrated, in which the shaft engaging part 103 located between the recessed compartments 104 and 106 is utilized to rotatably pivot to the first end 11 of the steering arm 10. Therefore, the first machine body 100 and the first end 11 of the steering arm 10 are formed of a correspondingly and rotatably pivoted type. The limiting part 202 disposed on the second machine body 200 is pivoted to the second end 12 of the steering arm 10, in which the second end 12 of the steering arm 10 is allowed to be rotated and vertically moved in the limiting part 202 of the second machine body 200.

Concretely speaking, the second end 12 of the steering arm 10 comprises an extension region 13 having a type of being perpendicularly connected to the steering arm 10. The limiting part 202 of the second machine body 200 formed with a type of elliptic profile is pivoted to the second end 12 of the steering arm 10 by cooperating with a fastener 20 (e.g., a shaft or pin).

Referring again to FIG. 1, the first machine body 100 further comprises a first pivoting part 105 pivoted to a slide seat 30 which is disposed between the first machine body 100 and the second machine body 200. The slide seat 30 comprises a second pivoting part 31 correspondingly pivoted to the first pivoting part 105 of the first machine body 100. With the arrangement of the slide seat 30, the first machine body 100 is allowed to rotate by taking the first pivoting part 105 and/or the slide seat 30 as a fulcrum, or the first machine body 100 is allowed to cover on the second machine body 200 so as not to outwardly expose the monitor front side 101 thereof, thereby assuring a guaranteed protection measure to the monitor front side 101 of the first machine body 100 (the related contents will be described in detail hereinafter).

In FIG. 1, the slide seat 30 movably disposed on a rail 203 of the second machine body 200 is illustrated. In an adopted embodiment, the rail 203 of the second machine body 200 is formed by a type of an inversed U-shaped section or profile, in which the rails 203 are respectively disposed at two sides of the second machine body 200. A slider 40 is movably assembled on the rail 203 of the second machine body 200, and the slide seat 30 is disposed on the slider 40, in which the slider 40 is formed by a type of a similar inversed U-shaped section. Therefore, the slide seat 30 can drive the slider 40 to freely move along the rail 203 of the second machine body 200. With the arrangement of the slide seat 30 cooperated with the steering arm 10, the first machine body 100 is allowed to freely slide on the second machine body 200, thereby forming a similar slide cover system functionally.

Referring to FIGS. 2 and 3, an operation condition, in which the first machine body 100 supported on the second machine body 200 by the steering arm 10 and the slide seat 30 is arranged at an inclined angle for a user observation and operation (touch-control), is illustrated; moreover, it is assumed that the position of the slide seat 30 is located at a motion initial point of the rail 203.

According to the operation condition of the first machine body 100 inclinedly arranged for the user observation and operation (touch-control) illustrated in FIGS. 2 and 3, two following considerations are essentially provided.

Firstly, due to the pivoting torque setting of the first pivoting part 105 of the first machine body 100 and the second pivoting part 31 of the slide seat 30, the first machine body 100 can be stably positioned or supported at any inclined angles. Secondly, due to the first end 11 of the steering arm 10 to be pivoted to the shaft engaging part 103 of the first machine body 100, another support mechanism formed by the steering arm 10 can be utilized to assist in positioning the first machine body 100.

Accordingly, the first machine body 100 is supported by at least two support mechanisms. In the adopted embodiment, it is allowable that the pivoting torque setting of the first pivoting part 105 of the first machine body 100 and the second pivoting part 31 of the slide seat 30 is allowed to have a large range of error, so that the assembling operation of these components is relatively convenient and simple, instead of professional technician's precision adjustment and the high-cost assembling operation in conventional skills.

FIG. 3 illustrates that the first machine body 100 is arranged at an inclined angle, the extension region 13 of the steering arm 10 and the connection portion of the steering arm 10 constitute a supporting fulcrum, thereby assisting the steering arm 10 in supporting the first machine body 100.

Referring to FIG. 4, when the first machine body 100 is pushed or pulled by the user, the slide seat 30 and the slider 40 are moved along the rail 203 of the second machine body 200, while the steering arm 10 is forced to rotate about the second end 12 thereof as a fulcrum, such as an illustrated condition shown by arrows in FIG. 4.

Figure 5:
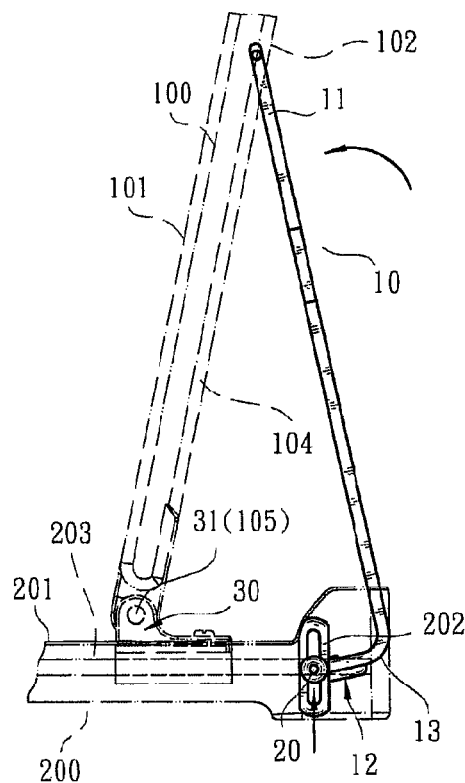
FIG. 5 is a schematic view of an embodiment of the present invention in another operation state, illustrating a movement condition of a second end of a steering arm located within a limiting part.
Figure 6:
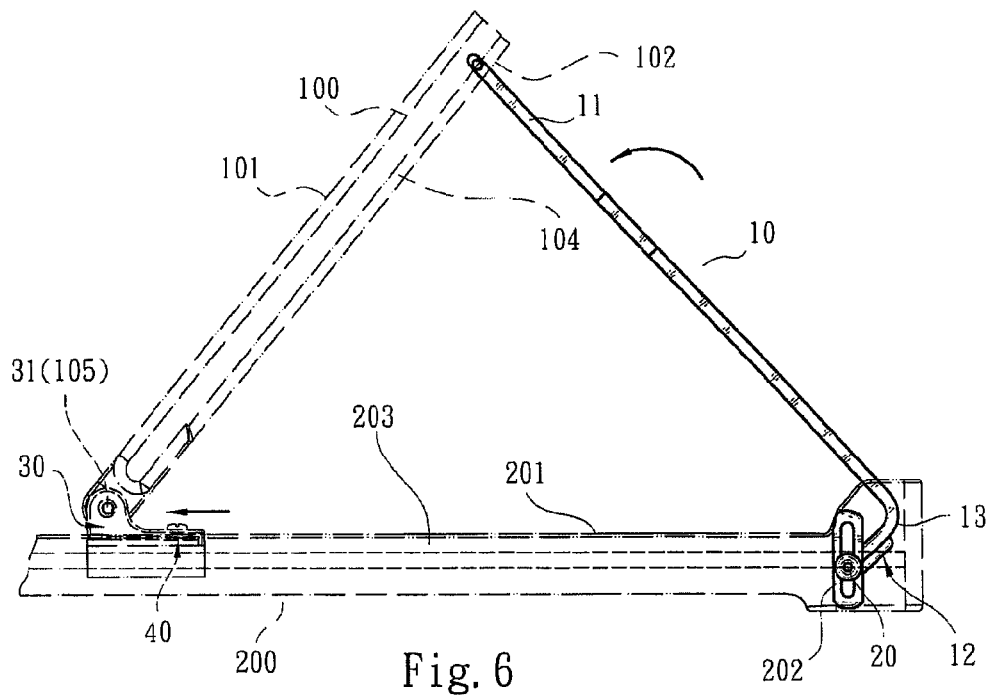
FIG. 6 is a schematic view of an embodiment of the present invention in still another operation state, illustrating a movement condition of a first machine body, a steering arm and a slide seat.

When the slide seat 30 is moved to a position as shown in FIG. 5, the steering arm 10 is rotated and the second end 12 of the steering arm 10 is upwardly translated along the limiting part 202 of the second machine body 200 (i.e., toward the top of the drawing of FIG. 5). Referring to FIGS. 5, 6 and 7, when continuing to move the first machine body 100 by an external force, the following states shall be included.

The first end 11 of the steering arm 10 and the shaft engaging part 103 of the first machine body 100 are relatively rotated in response to a translational motion of the first machine body 100; meanwhile, the second end 12 of the steering arm 10 is rotated and moved in the limiting part 202 of the second machine body 200 by taking the fastener 20 as a fulcrum. In addition, when the slide seat 30 is moved to a position as shown in FIG. 7, the second end 12 of the steering arm 10 is forced to downwardly move (i.e., toward the bottom of the drawing of FIG. 7), influenced by the distance between the slide seat 30 and the second end 12 of the steering arm 10 and the inclined angle of the first machine body 100. Moreover, cooperated with the support mechanism which is formed by the second pivoting part 31 of the slide seat 30, the first pivoting part 105 of the first machine body 100 and the steering arm 10, the inclined angle of the first machine body 100 can be continuously changed, and the first machine body 100 can be positioned and provided for the user to perform touch-controlled functions.

Figure 9:
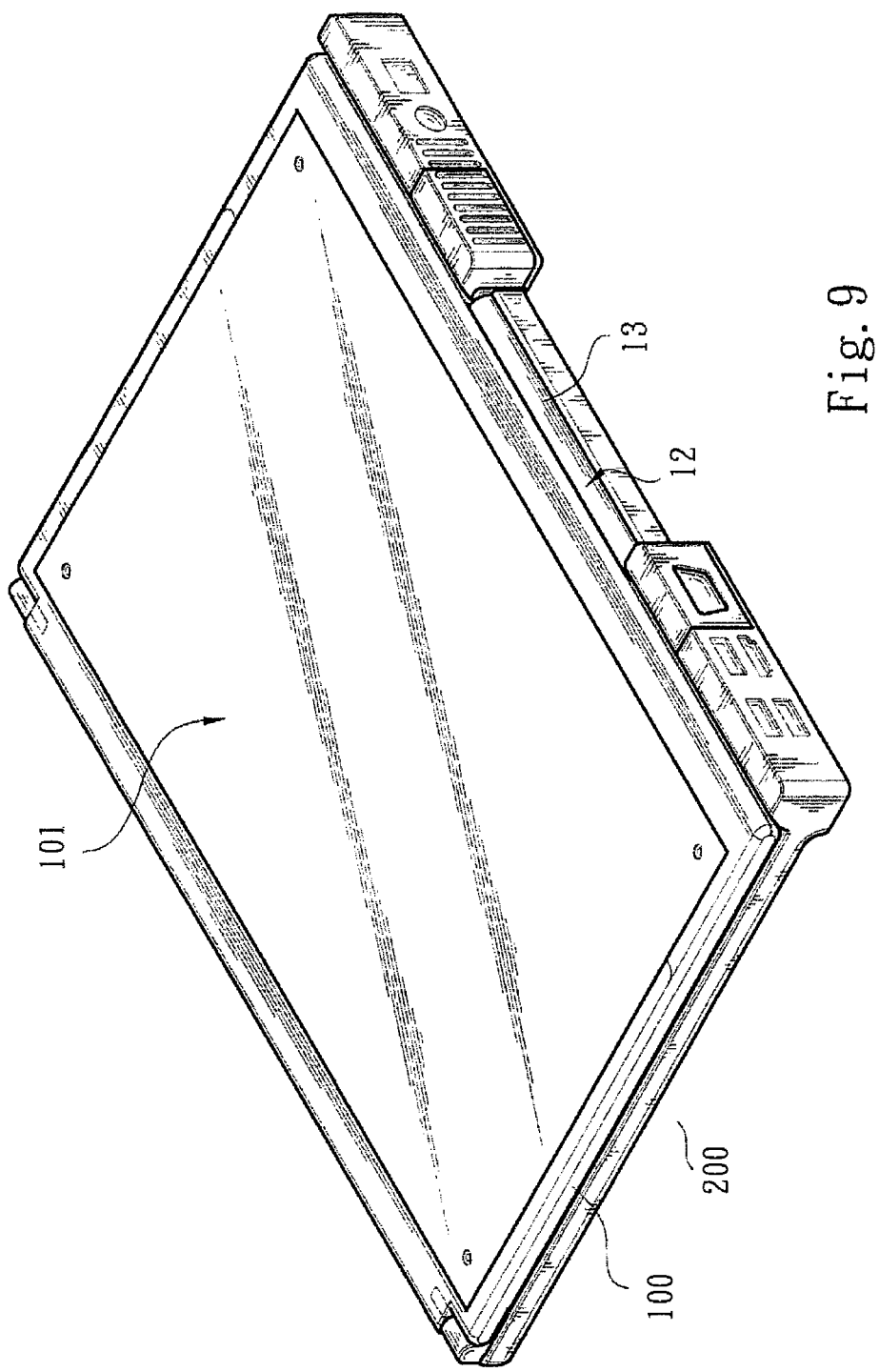
FIG. 9 is a schematic perspective view of the embodiment in FIG. 8.

Referring to FIGS. 8 and 9, a condition of the slide seat 30 to be moved to the final position of the rail 203 of the second machine body 200 and the first machine body 100 to be kept flat on the second machine body is illustrated. At this moment, the steering arm 10 is received in the recessed compartment 106 of the monitor back side 102 of the first machine body 100. As shown in FIGS. 8 and 9, it is understood that the folding type of the electronic device is convenient for being carried on by the user, and the folding electronic device also provides the user with touch-controlled functions.

In FIGS. 10, 11, 12 and 13, a condition in which the first machine body 100 is covered on the second machine body 200 so as to provide the guaranteed protection measure to the monitor front side 101 of the first machine body 100 is illustrated.

Referring to FIG. 10, when the user forces the first machine body 100 to cover the second machine body 200, the first machine body 100 is rotated about a fulcrum formed by the first pivoting part 105 of the first machine body 100 and the second pivoting part 31 of the slide seat 30. The first end 11 of the steering arm 10 and the shaft engaging part 103 of the first machine body 100 are relatively rotated in response to a rotational motion of the first machine body 100; meanwhile, the second end 12 of the steering arm 10 is rotated in the limiting part 202 of the second machine body 200 by taking the fastener 20 as a fulcrum.

Figure 12:
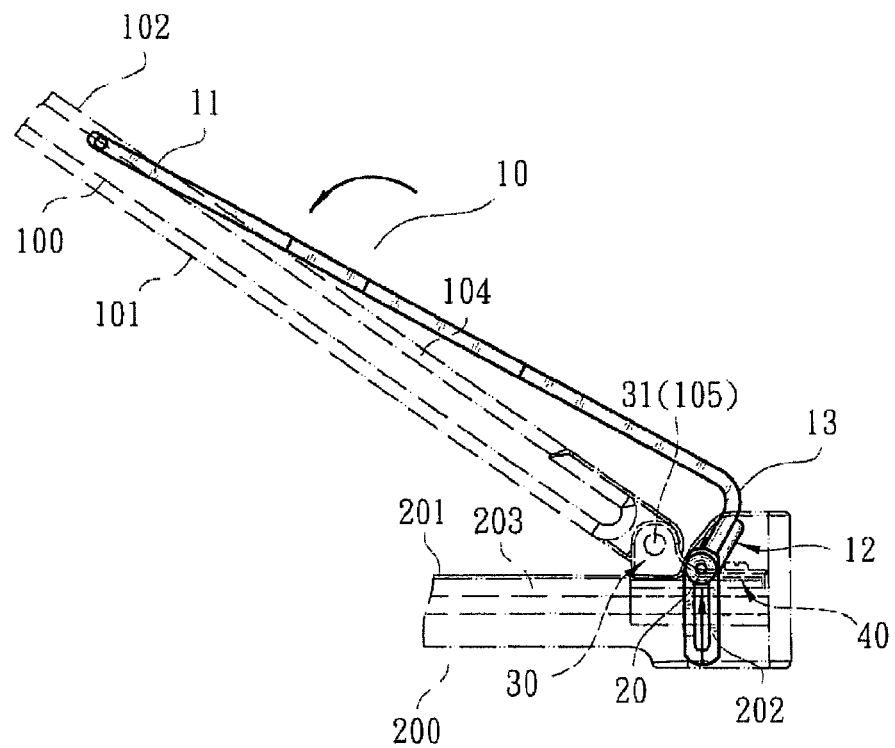
FIG. 12 is a schematic view of an embodiment of the present invention in another operation state, illustrating a movement condition in which a first machine body is rotated to cover a second machine body and a second end of a steering arm is translated to a top end of a limiting part.
Figure 13:
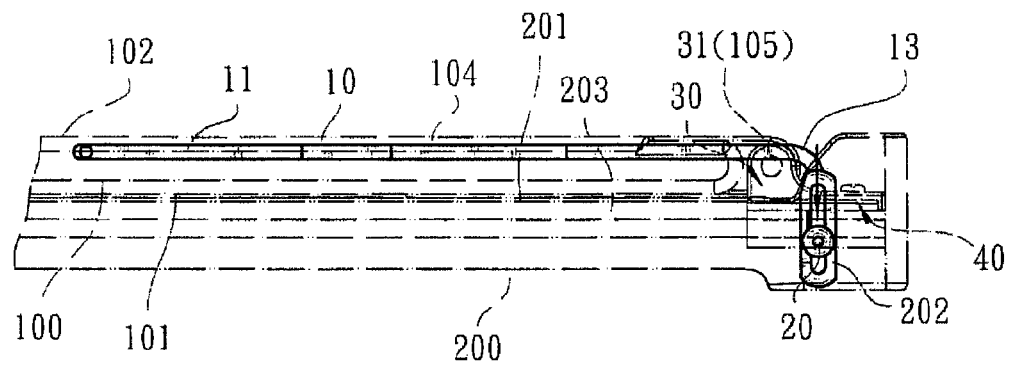
FIG. 13 is a schematic view of an embodiment of the present invention in still another operation state, illustrating a condition in which a covered style is formed by a first machine body and a second machine body, a second end of a steering arm is moved toward a place below a limiting part, and a steering arm is received in a recessed compartment of the first machine body.
Figure 14:
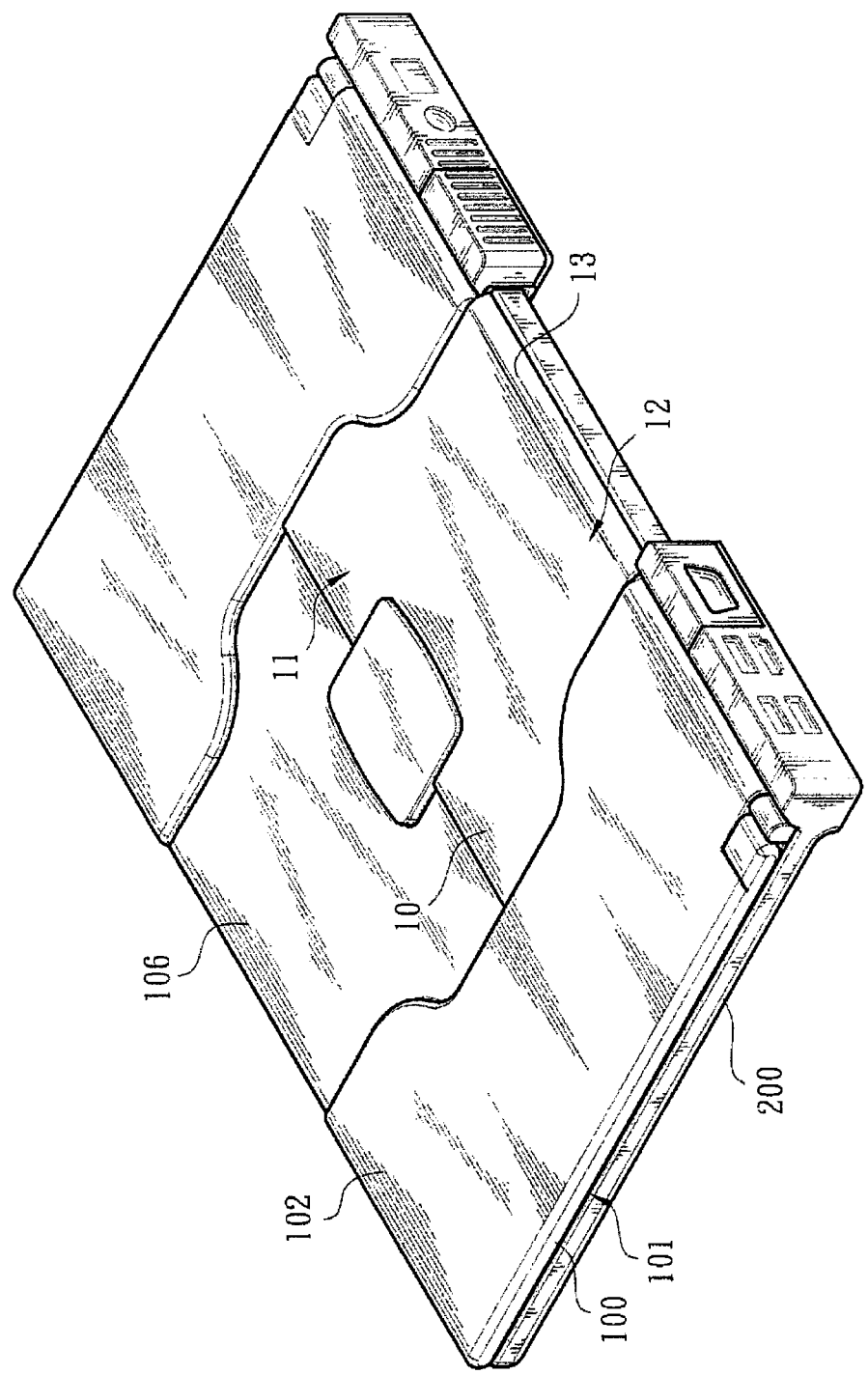
FIG. 14 is a perspective schematic view of the embodiment in FIG. 13.

In FIGS. 11 and 12, a condition in which the second end 12 of the steering arm 10 is forced to upwardly translate (i.e., toward the top of the drawing of FIGS. 11 and 12) by the inclined angle of the first machine body 100 is illustrated, in particular illustrates in FIG. 12 that the second end 12 of the steering arm 10 is translated to a top end of the limiting part 202. When the first machine body 100 is rotated from the position in FIG. 12 to the position in FIG. 13, the second end 12 of the steering arm 10 is downwardly translated (i.e., toward the bottom of the drawing of FIGS. 12 and 13), cooperated with the change of rotational position of the first machine body 100. As shown in FIGS. 13 and 14, when the first machine body 100 is covered on the second machine body 200, the steering arm 10 is received in the recessed compartment 104 of the monitor back side 102 of the first machine body 100, thus to form a covered style of the first machine body 100 and the second machine body 200. It is understood that, a guaranteed protection effect to the monitor front side 101 of the first machine body 100 is particularly illustrated in FIG. 14. Accordingly, with the functions and effects of the present invention, the condition such as the outwardly-exposed conventional monitor to be easily damaged can be greatly improved.

It shall be further explained that, due to the first machine body 100 simultaneously supported by the slide seat 30 and the steering arm 10, the first machine body 100 become more stable and perfect to be rotated and moved in the operation process, compared to conventional skills. Further, in conventional skills that the monitor supported by a single support mechanism has disadvantages of high degrees of freedom in the moving or folding process to cause wobbles and damage can be greatly improved.

Representatively speaking, under the term of the first machine body 100 capable of being assisted in the motion operation, the slide and rotation module for the executable multiple operation mode electronic device of the present invention provides the following considerations and advantages, compared to conventional skills.

Firstly, the structural design and configuration relationships of the slide and rotation module, the first and second machine bodies or the components connected therewith have been redesigned and reconsidered, capable of providing innovated use pattern and application range to be distinguished from conventional skills.

Secondly, with the functions provided by the slide and rotation module in accordance to different operation environments or usage requirements, the first machine body 100 simultaneously supported by the slide seat 30 and the steering arm 10 can have ideal support mechanisms, so that the first machine body 100 can be arranged at different inclined angles, kept flat, or set into different operation modes on the second machine body 200 for the user operation. Further, the user can directly operate the first machine body 100 covered on the second machine body 200, in which an ideal protection effect of the monitor front side 101 of the first machine body 100 can be obtained.

Thirdly, with the fitting structures of the slide seat 30 and the first pivoting part 105 of the first machine body 100, the first end 11 of the steering arm 10 and the shaft engaging part 103 of the first machine body 100, and the second end 12 of the steering arm 10 and the limiting part 202 of the second machine body 200, it is therefore that imperfect conditions in conventional skills such as complicated rotary shaft torque setting, increased assembling cost and operating processes of the monitor, difficulties of controlling the turn-over motion of the monitor, and damages caused from unstable positioning of the monitor can be improved.

Fourthly, with the fitting structures of the slide seat 30 and the first pivoting part 105 of the first machine body 100, the first end 11 of the steering arm 10 and the shaft engaging part 103 of the first machine body 100, and the second end 12 of the steering arm 10 and the limiting part 202 of the second machine body 200, the first machine body 100 can have stable supporting and positioning mechanisms. It is therefore that imperfect conditions in conventional skills such as difficult to perform touch-controlled functions of the inclined monitor due to the unreliable and unstable positioned monitor can be equally improved.

In conclusion, the slide and rotation module for the executable multiple operation mode electronic device of the present invention effectively provides a unique spatial pattern different from conventional skills and incomparable advantages and inventiveness.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A slide and rotation module for an executable multiple operation mode electronic device, comprising:
a steering arm comprising a first end pivoted to a first machine body and a second end pivoted to a second machine body, the second end of the steering arm being rotated and translated within a limiting part in response to a motion of the first machine body; and
a slide seat disposed between the first machine body and the second machine body.

2. The slide and rotation module for the executable multiple operation mode electronic device as claimed in claim 1, wherein the steering arm comprises a plate type with a geometry profile.

3. The slide and rotation module for the executable multiple operation mode electronic device as claimed in claim 1, wherein the first machine body comprises a monitor system defined with a monitor front side and a monitor back side, and the second machine body comprises a host machine having an operating region.

4. The slide and rotation module for the executable multiple operation mode electronic device as claimed in claim 3, wherein the monitor back side of the first machine body comprises at least one recessed compartment having a shape equal to a profile of the steering arm.

5. The slide and rotation module for the executable multiple operation mode electronic device as claimed in claim 4, wherein the monitor back side of the first machine body comprises a plurality of recessed compartments, and the monitor back side of the first machine body further comprises a shaft engaging part located between the recessed compartments and correspondingly and rotatably pivoted to the first end of the steering arm.

6. The slide and rotation module for the executable multiple operation mode electronic device as claimed in claim 1, wherein the first machine body comprises at least one recessed compartment having a shape equal to a profile of the steering arm.

7. The slide and rotation module for the executable multiple operation mode electronic device as claimed in claim 1, wherein the first machine body comprises a shaft engaging part rotatably pivoted to the first end of the steering arm.

8. The slide and rotation module for the executable multiple operation mode electronic device as claimed in claim 1, wherein the limiting part is disposed on the second machine body and pivoted to the second end of the steering arm.

9. The slide and rotation module for the executable multiple operation mode electronic device as claimed in claim 8, wherein the limiting part comprising a type of elliptic profile is pivoted to the second end of the steering arm by incorporating with a fastener.

10. The slide and rotation module for the executable multiple operation mode electronic device as claimed in claim 1, wherein the second end of the steering arm comprises an extension region having a type of being perpendicularly connected to the steering arm.

11. The slide and rotation module for the executable multiple operation mode electronic device as claimed in claim 1, wherein the first machine body comprises a first pivoting part, and the slide seat comprises a second pivoting part correspondingly pivoted to the first pivoting part of the first machine body.

12. The slide and rotation module for the executable multiple operation mode electronic device as claimed in claim 1, wherein the second machine body comprises at least one rail, and the slide seat is movably disposed on the rail of the second machine body.

13. The slide and rotation module for the executable multiple operation mode electronic device as claimed in claim 12, wherein the second machine body comprises two rails respectively disposed at two sides of the second machine body, and each of the rails of the second machine body comprises a type of an inversed U-shaped profile.

14. The slide and rotation module for the executable multiple operation mode electronic device as claimed in claim 12 further comprising a slider movably assembled on the rail of the second machine body.

15. The slide and rotation module for the executable multiple operation mode electronic device as claimed in claim 14, wherein the slider comprises a type of an inversed U-shaped section.

16. The slide and rotation module for the executable multiple operation mode electronic device as claimed in claim 14, wherein the slide seat is disposed on the slider.

* * * * *